US009999879B2

(12) United States Patent
Bischof et al.

(10) Patent No.: US 9,999,879 B2
(45) Date of Patent: Jun. 19, 2018

(54) FORMED CERAMIC SUBSTRATE COMPOSITION FOR CATALYST INTEGRATION

(71) Applicant: CORNING INCORPORATED, Corning, NY (US)

(72) Inventors: Christian Bischof, Corning, NY (US); Cameron Wayne Tanner, Horseheads, NY (US); Patrick David Tepesch, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 449 days.

(21) Appl. No.: 13/906,133

(22) Filed: May 30, 2013

(65) Prior Publication Data
US 2014/0357473 A1 Dec. 4, 2014

(51) Int. Cl.
| | | |
|---|---|---|
| *B01J 35/10* | (2006.01) | |
| *B01D 53/94* | (2006.01) | |
| *C04B 35/195* | (2006.01) | |
| *C04B 35/478* | (2006.01) | |
| *C04B 38/00* | (2006.01) | |
| *B01J 29/76* | (2006.01) | |
| *B01J 35/00* | (2006.01) | |

(52) U.S. Cl.
CPC .......... *B01J 35/10* (2013.01); *B01D 53/9418* (2013.01); *B01J 29/763* (2013.01); *B01J 35/002* (2013.01); *B01J 35/1042* (2013.01); *C04B 35/195* (2013.01); *C04B 35/478* (2013.01); *C04B 38/0006* (2013.01); *B01D 2255/20761* (2013.01); *B01D 2255/50* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3225* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3262* (2013.01); *C04B 2235/3272* (2013.01); *C04B 2235/3275* (2013.01); *C04B 2235/3279* (2013.01); *C04B 2235/3284* (2013.01); *C04B 2235/42* (2013.01); *C04B 2235/725* (2013.01); *C04B 2235/727* (2013.01); *C04B 2235/9607* (2013.01)

(58) Field of Classification Search
CPC .................................................. B01J 29/723
See application file for complete search history.

(56) References Cited

U.S. PATENT DOCUMENTS

| | | | |
|---|---|---|---|
| 1,888,039 A | 11/1932 | Huff | |
| 3,979,216 A | 9/1976 | Fritsch, Jr. et al. | 106/62 |
| 4,204,027 A | 5/1980 | Simon | |
| 4,344,785 A | 8/1982 | Jensen | |
| 4,363,644 A | 12/1982 | Sato et al. | 55/523 |
| 4,434,117 A | 2/1984 | Inoguchi et al. | |
| 4,476,236 A | 10/1984 | Inoguchi et al. | 501/118 |
| 5,030,398 A | 7/1991 | Hamanaka et al. | 264/63 |
| 5,114,643 A | 5/1992 | Beall et al. | 264/63 |
| 5,183,608 A | 2/1993 | Guile | 264/44 |
| 5,851,258 A | 12/1998 | Ando et al. | |
| 6,716,512 B2 | 4/2004 | Yamamoto et al. | 428/116 |
| 6,849,181 B2 | 2/2005 | Ogunwumi et al. | |
| 6,933,255 B2 | 8/2005 | Beall et al. | 501/128 |
| 7,007,532 B2 | 3/2006 | Singer et al. | |
| 7,011,788 B2 | 3/2006 | Fukuda et al. | 264/674 |
| 7,150,165 B2 | 12/2006 | Pitbladdo | |
| 7,341,970 B2 | 3/2008 | Beall et al. | |
| 7,358,210 B2 | 4/2008 | Tanaka et al. | |
| 7,490,487 B2 | 2/2009 | Singer et al. | |
| 7,528,087 B2 | 5/2009 | Saha et al. | 501/128 |
| 7,544,320 B2 | 6/2009 | Toda et al. | 264/653 |
| 7,601,662 B2 | 10/2009 | Bull et al. | 502/60 |
| 7,618,699 B2 | 11/2009 | Beall et al. | 428/116 |
| 8,196,434 B2 | 6/2012 | Pitbladdo | |
| 8,408,029 B2 | 4/2013 | De Angelis et al. | |
| 8,685,363 B2 | 4/2014 | Fukuda et al. | |
| 8,926,913 B2 | 1/2015 | Henry et al. | |
| 2004/0067369 A1 | 4/2004 | Ott et al. | |

(Continued)

FOREIGN PATENT DOCUMENTS

| | | |
|---|---|---|
| CN | 201704191 | 1/2011 |
| EP | 0 593 898 | 4/1994 |

(Continued)

OTHER PUBLICATIONS

DieselNet: Emission Standards, European Union, Cars and Light Trucks, May 28, 2013, http://www.dieselnet.com/standards/eu/ld.php, p. 1-7.
DieselNet: Emission Standards, United States, Cars and Light-Duty Trucks—California, May 28, 2013, http://www.dieselnet.com/standards/us/ld_ca.php, p. 1-7
Korhonen, S.T., et al., "Isolated $Cu^{2+}$ ions: active sites for selective catalytic reduction of NO", Chem. Commun., 2011, 47, p. 800-802.
"Overview of the Human Health and Environmental Effects of Power Generation: Focus on Sulfur Dioxide ($SO_2$), Nitrogen Oxides ($NO_x$) and Mercury (Hg)", Jun. 2002, p. 1-15.

(Continued)

*Primary Examiner* — Sheng H Davis

(57) ABSTRACT

Disclosed herein are formed ceramic substrates comprising an oxide ceramic material, wherein the formed ceramic substrate comprises a low elemental alkali metal content, such as less than about 1000 ppm. Also disclosed are composite bodies comprising at least one catalyst and a formed ceramic substrate comprising an oxide ceramic material, wherein the composite body has a low elemental alkali metal content, such as less than about 1000 ppm, and methods for preparing the same.

10 Claims, 8 Drawing Sheets

(56) References Cited

U.S. PATENT DOCUMENTS

| | | | |
|---|---|---|---|
| 2004/0134235 | A1 | 7/2004 | Pitbladdo |
| 2005/0160769 | A1 | 7/2005 | Sakai et al. |
| 2005/0229637 | A1 | 10/2005 | Hamashima et al. |
| 2006/0096322 | A1 | 5/2006 | Singer et al. |
| 2007/0004953 | A1* | 1/2007 | Voskoboynikov ....... B01J 29/00 585/653 |
| 2007/0081934 | A1 | 4/2007 | Hubig et al. ............... 423/239.1 |
| 2007/0084247 | A1 | 4/2007 | Pitbladdo |
| 2007/0259153 | A1 | 11/2007 | Noguchi et al. ............. 428/116 |
| 2008/0032090 | A1 | 2/2008 | Beall et al. |
| 2008/0034798 | A1 | 2/2008 | Bergman et al. |
| 2008/0057267 | A1 | 3/2008 | Brocheton et al. .......... 428/116 |
| 2008/0148779 | A1 | 6/2008 | Takeshita et al. |
| 2010/0086731 | A1 | 4/2010 | Noguchi et al. ............. 428/116 |
| 2010/0237007 | A1* | 9/2010 | Merkel .............. B01D 46/2418 210/510.1 |
| 2011/0020204 | A1 | 1/2011 | Bull et al. |
| 2011/0165051 | A1* | 7/2011 | Beutel ................ B01D 53/9418 423/239.2 |

FOREIGN PATENT DOCUMENTS

| | | |
|---|---|---|
| JP | 2000128548 | 5/2000 |
| JP | 2012-110849 | 6/2012 |
| WO | 2005/087690 | 9/2005 |
| WO | 2007020773 | 2/2007 |
| WO | 2008/106518 | 9/2008 |
| WO | 2008/106519 | 9/2008 |
| WO | 2009119748 A1 | 10/2009 |
| WO | 2009/141324 | 11/2009 |
| WO | 2011/073398 | 6/2011 |
| WO | 2012/074833 | 6/2012 |

OTHER PUBLICATIONS

Patent Cooperation Treaty International Notification of Transmittal of the International Search Report and the Written Opinion of the International Searching Authority, international application No. PCT/US2014/039507; dated Sep. 3, 2014, 11 pages.

Patent Cooperation Treaty International Notification of Transmittal of the International Search Report and the Written Opinion of the International Searching Authority, international application No. PCT/US2014/039498; dated Sep. 2, 2014, 12 pages.

F. Schäfer, R. van Basshuysen, Reduced Emissions and Fuel Consumption in Automobile Engines, Springer-Verlag, ISBN 3-211-82718-8, 1995, pp. 10-13.

R.M. Heck and R.J. Farrauto, Catalytic Air Pollution Control, Second Edition, Johnson Wiley and Sons, New York, ISBN 0-471-43624-0, pp. 2002, pp. 205-206.

Wang, Hong, et al.; "Small-Pore Molecular Sieves SAPO-34 with Chabazite Structure: Theoretical Study of Silicon Incorporation and Interrelated Catalytic Activity", http://adsabs.harvard.edu/abs/2011APS..MARY39002W; accessed Jan. 22, 2016.

English Translation of CN201480041189.7 Notice of First Office Action dated Sep. 29, 2016; 21 Pages; Chinese Patent Office.

* cited by examiner

FORMED CERAMIC SUBSTRATE COMPOSITION FOR CATALYST INTEGRATION

TECHNICAL FIELD

The disclosure relates to formed ceramic substrates, and compositions thereof. In various embodiments of the disclosure, the formed ceramic substrates may be used as a support for catalysts. In further embodiments, the chemical composition of the formed ceramic substrates may have a low level of chemical interaction with said catalysts.

BACKGROUND

Formed ceramic substrates, including but not limited to high surface area structures, may be used in a variety of applications. Such formed ceramic substrates may be used, for example, as supports for catalysts for carrying out chemical reactions or as sorbents or filters for the capture of particulate, liquid, or gaseous species from fluids such as gas streams and liquid streams. As a non-limiting example, certain activated carbon bodies, such as, for example, honeycomb-shaped activated carbon bodies, may be used as catalyst substrates or for the capture of heavy metals from gas streams.

Currently, little attention is paid to the chemical composition of formed ceramic substrates, such as cordierite and aluminum titanate based products, as no chemical interactions have been reported. Many current products aim for high porosity for the integration of selective catalytic reduction (SCR) catalysts. However, at least some of these products show undesirable impurity ranges, and interactions have been reported, such as, for example, with metal-based catalysts. Thus, there is a need in the art to prepare formed ceramic substrates that are compatible with a broader range of SCR catalysts.

SUMMARY

In accordance with various exemplary embodiments of the disclosure, a formed ceramic substrate is disclosed. In at least certain embodiments, the formed ceramic substrate comprises an oxide ceramic material. The formed ceramic substrates disclosed herein may, in at least certain exemplary embodiments, allow for catalytic activity to be substantially maintained. In various exemplary embodiments, the formed ceramic substrates comprise a low elemental alkali or alkaline earth metal content, such as, for example, less than about 1400 parts per million ("ppm"), less than about 1200 ppm, or less than about 1000 ppm. In other exemplary embodiments, the formed ceramic substrates comprise a low elemental alkali metal content, such as, for example, less than about 1000 ppm, less about 800 ppm, less than about 750, less than about 650 ppm, or less than about 500 ppm. In other exemplary embodiments, the formed ceramic substrates comprise a low sodium content, such as, for example, less than about 1000 ppm, less about 800 ppm, less than about 750, less than about 650 ppm, or less than about 500 ppm. In further exemplary embodiments, the oxide ceramic material is chosen from at least one of a cordierite phase, an aluminum titanate phase, and fused silica. In certain embodiments, the oxide ceramic material is a cordierite/mullite/ aluminum titanate ("CMAT") composition.

As used herein, "an elemental alkali or alkaline earth metal concentration of less than about 1400 ppm" indicates less than about 0.14 wt % total alkali or alkaline earth metal, wherein alkali or alkaline earth metal includes any of lithium, sodium, potassium, rubidium, caesium, francium, beryllium, calcium, strontium, barium, and radium. As used herein, "an elemental alkali metal concentration of less than about 1000 ppm" indicates less than about 0.10 wt % total alkali metal, wherein alkali metal includes any of lithium, sodium, potassium, rubidium, caesium, and francium.

According to yet further exemplary embodiments are disclosed composite bodies, and methods of preparing composite bodies, having a substantially maintained catalytic activity. In certain embodiments, a method of preparing a composite body having a substantially maintained BET surface area after thermal aging comprises the steps of providing a formed ceramic substrate prepared from a substrate composition comprising an oxide-containing ceramic-forming material, wherein the batch components of the substrate composition are chosen such that the content of elemental alkali or alkaline earth metal in the formed ceramic substrate is less than about 1400 ppm, and applying at least one catalyst to the formed ceramic substrate. In certain embodiments, the batch components of the substrate composition are chosen such that the content of elemental alkali metal in the formed ceramic substrate is less than about 1200 ppm or less than about 1000 ppm. In certain other embodiments, the batch components of the substrate composition are chosen such that the content of elemental sodium in the formed ceramic substrate is less than about 1200 ppm or less than about 1000 ppm. In certain embodiments, the oxide-containing ceramic-forming material is chosen from a cordierite phase, an aluminum titanate phase, and fused silica. In yet further exemplary embodiments, the oxide ceramic material is a CMAT composition.

In accordance with various embodiments of the invention, the substrate composition disclosed herein may have a high porosity, such as a porosity greater than about 55%.

In accordance with various other embodiments of the disclosure, the composite body disclosed herein has a low coefficient of thermal expansion, such as a coefficient of thermal expansion less than about $3 \times 10^{-6}/^\circ$ C. from about $25^\circ$ C. to about $800^\circ$ C.

Both the foregoing general summary and the following detailed description are exemplary only and are not restrictive of the disclosure. Further features and variations may be provided in addition to those set forth in the description. For instance, the disclosure describes various combinations and subcombinations of the features disclosed in the detailed description. In addition, it will be noted that where steps are disclosed, the steps need not be performed in that order unless explicitly stated.

DESCRIPTION OF EXEMPLARY EMBODIMENTS

Figure 1:
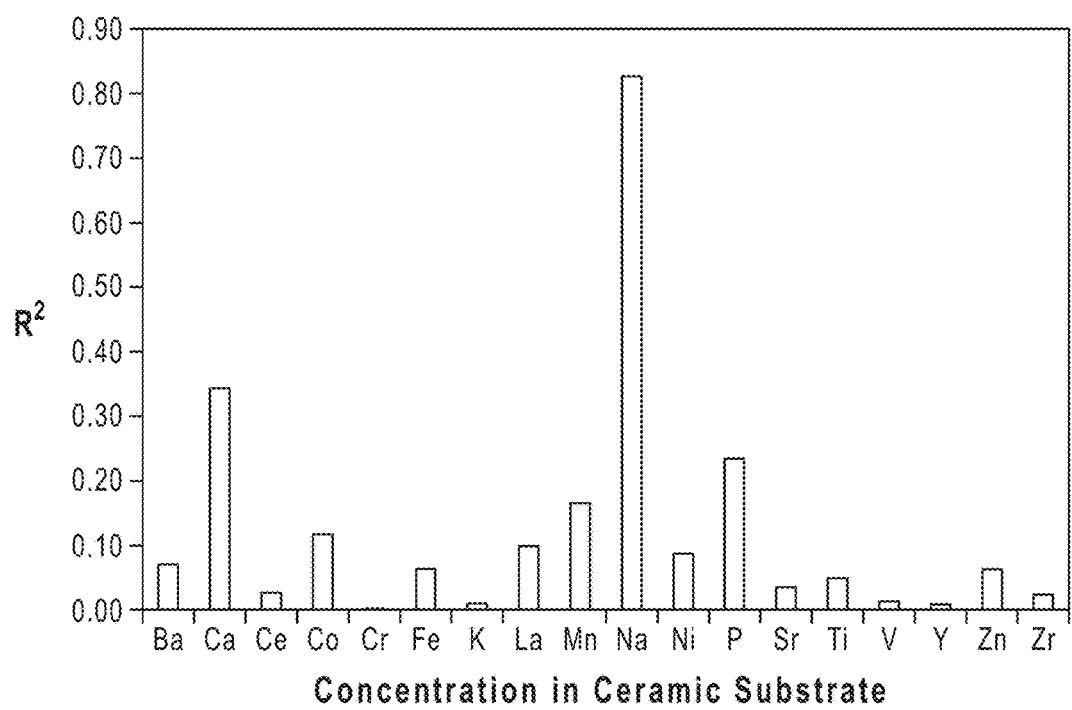
FIG. 1 is a bar graph showing the value of the determination coefficient, $R^2$, between the copper chabazite ("Cu/CHA") zeolite surface area loss after thermal aging and the concentration of each of the individual elements in a cordierite ceramic with which the zeolite was admixed. The correlation between surface area loss and sodium content of the ceramic indicates the desirability of maintaining a low sodium content in the formed ceramic substrate in order to maintain high BET surface area, i.e., high catalytic activity after thermal aging.

According to one exemplary embodiment, formed ceramic substrates having an elemental alkali or alkaline earth metal concentration of less than about 1400 ppm are disclosed. According to another exemplary embodiment, formed ceramic substrates having an elemental alkali metal concentration of less than about 1000 ppm are disclosed. In certain embodiments, the formed ceramic substrates have an elemental sodium concentration of less than about 1000 ppm. As used herein, "an elemental sodium concentration of less than about 1000 ppm" indicates less than about 0.10 wt % Na, or less than about 0.13% $Na_2O$. In various embodiments, the formed ceramic substrates may have a porosity of at least about 50%, such as at least about 60%.

In certain exemplary embodiments, the formed ceramic substrate is comprised predominantly of a cordierite phase, an aluminum titanate phase, or fused silica. In yet further exemplary embodiments, the formed ceramic substrate predominantly comprises a CMAT composition. As used herein, the term "predominantly" means at least about 50% by weight, such as at least about 60%, at least about 70%, or at least about 75%, by weight. The percent by weight can be measured as a percentage by weight of the total crystalline phases of the formed ceramic substrate. This percentage may be measured by any means known to those skilled in the art, such as, for example, by Rietveld x-ray diffractometry.

In yet further embodiments, the formed ceramic substrate may comprise a catalyst. For example, the formed ceramic substrate may be coated with a zeolite catalyst such as a copper-containing zeolite, for example Cu/CHA, and may be a composite body. Such a composite body may be useful, as non-limiting examples, as an exhaust gas particulate filter or substrate such as for vehicles powered by diesel or gasoline internal combustion engines. In various non-limiting embodiments, the composite body may be in the form of a honeycomb body.

It has been found that, depending upon the zeolite type, interaction between the ceramic substrate material, such as a cordierite or aluminum titanate substrate material, and a zeolite catalyst can occur during typical aging conditions, such as exposure to elevated temperatures, e.g. greater than about 700° C., and hydrothermal conditions, e.g. water vapor present at about 1-15%. The low alkali or alkaline earth metal content of the formed ceramic substrate compositions disclosed herein may result in a reduced interaction with zeolite catalysts, for example Cu/CHA zeolites, under such typical thermal aging conditions, in at least certain embodiments.

Accordingly, the alkali metal content of the formed ceramic substrate in certain embodiments disclosed herein may be less than about 1000 ppm, such as less than about 800 ppm, less than about 650 ppm, or less than about 500 ppm. In certain embodiments, the elemental sodium content of the formed ceramic substrate may be less than about 1000 ppm, such as less than about 800 ppm, less than about 650 ppm, or less than about 500 ppm. In further exemplary embodiments, the sum of the sodium plus other elemental alkali or alkaline earth metal contents in the formed ceramic substrate may be less than about 1400 ppm (expressed as the elements), for example less than about 1200 ppm, 1000 ppm, or less than about 700 ppm.

In at least certain exemplary embodiments, the porosity of the formed ceramic substrate may be at least about 55%, such as, for example, at least about 58%, at least about 60%, at least about 62%, at least about 64%, at least about 65%, or at least about 66%. Increased porosity may be beneficial in accommodating large amounts of catalyst within the porous walls of the formed ceramic substrate, for example in a honeycomb wall-flow filter, while maintaining a low pressure drop.

A large median pore diameter may also help to maintain a low pressure drop, for example in a catalyzed wall-flow filter. In certain embodiments, the median pore diameter of the formed ceramic substrate may be at least about 10 μm, such as, for example at least about 12 μm, at least about 15 μm, at least about 17 μm, at least about 18 μm, at least about 22 μm, or at least about 24 μm.

The pore size distribution of the formed ceramic substrate may satisfy the condition that $d_f$, defined as $(d_{50}-d_{10})/d_{50}$, is less than about 0.50, such as for example less than about 0.45, less than about 0.40, or less than about 0.35. In certain exemplary embodiments, the $d_f$ is less than about 0.2, such as about 0.16. This is because small values of $d_f$ tend to correlate with minimal penetration of soot into the walls of the formed ceramic substrate which would otherwise tend to increase pressure drop. In certain embodiments, the pore size distribution may also satisfy the condition that $d_b$, defined as $(d_{90}-d_{10})/d_{50}$, is less than about 2.0, such as, for example, less than about 1.8, less than about 1.5, or less than about 1.25. In other exemplary embodiments, $d_b$ is less than about 1.0, such as, for example, less than about 0.9, less than about 0.5, or less than about 0.4. Low values of $d_b$ imply fewer large pores, which may reduce the strength of the formed ceramic substrate and, in certain embodiments, the filtration efficiency of the filter. The values of $d_{10}$, $d_{50}$, and $d_{90}$ are the pore diameters at which about 10%, 50%, and 90%, respectively, of the pores are of a smaller diameter on a pore volume basis, and pore diameter and % porosity may be measured, for example, on the bulk formed ceramic by mercury porosimetry.

As used herein, the term modulus of rupture (MOR) is the modulus of rupture of the formed ceramic substrate, as measured by the four-point method on a cellular ceramic bar whose length is parallel to the direction of the channels. The term closed frontal area (CFA) refers to the closed frontal area fraction of the formed ceramic substrate, that is, the fraction of area occupied by the porous ceramic walls in a cross section taken perpendicular to the direction of the channels.

In certain embodiments according to the disclosure, the value of MOR/CFA may be at least about 125 psi, such as, for example, at least about 200 psi, at least about 300 psi, or at least about 400 psi. In other exemplary embodiments, the value of MOR/CFA may be at least about 500 psi, such as, for example at least about 800 psi, at least about 1000 psi, at least about 1200 psi, at least about 1400 psi, or at least about 1600 psi. The CFA may be computed from the relation:

$$CFA = (\text{bulk density of substrate}) / [(\text{skeletal density of ceramic})(1-P)]$$

where P=% porosity/100. The bulk density of the substrate is determined by measuring the mass of an approximately 0.5 inch×1.0 inch×5 inch bar of the ceramic honeycomb substrate cut parallel to the length of the channels and dividing by the volume of the ceramic bar (height×width× length); the skeletal density of the ceramic is determined by standard methods known in the art, such as by mercury porosimetry or the Archimedes method, or may be set equal to the theoretical density of the ceramic as computed from the crystallographic unit cell densities of the individual phases comprising the ceramic.

For a predominantly cordierite formed ceramic substrate, the skeletal density may be approximately 2.51 g cm$^{-3}$. For a predominantly aluminum titanate formed ceramic substrate, the skeletal density may be range from about 3.2 g cm$^{-3}$ to about 3.5 g cm$^{-3}$, such as, for example, about 3.25 g cm$^{-3}$. A high value of MOR/CFA may, in certain exemplary embodiments, be desired to provide mechanical durability during handling and use. Moreover, a high value of MOR/CFA may enable the use of high % porosity, large median pore size, and/or thin walls to achieve low pressure drop when the formed ceramic substrate is used as a filter.

In various other exemplary embodiments disclosed herein, the strain tolerance, defined as MOR/E, of the formed ceramic substrate may be at least about 0.10% (0.10×10$^{-2}$), for example at least about 0.12%, or at least about 0.14%, where E is the Young's elastic modulus as measured by a sonic resonance technique on a cellular bar parallel to the lengths of the channels and having the same cell density and wall thickness as the specimen used in the measurement of MOR. In certain other exemplary embodiments, the strain tolerance of the formed ceramic substrate may be at least about 0.08%, for example at least about 0.09%. A high strain tolerance may be desirable for achieving high thermal shock resistance.

In still other embodiments, the microcrack index, designated "Nb$^3$," is less than about 0.10, such as less than about 0.08, less than about 0.06, or less than about 0.04. Microcracking may occur from residual stresses that arise during cooling of a fired formed ceramic substrate. For example, microcracks may form and open during cooling and close again during heating. Microcracking may lower the thermal expansion of a formed ceramic substrate in addition to reducing its strength. The microcrack index may be defined by the relation Nb$^3$=(9/16)[(E°$_{25}$/E$_{25}$)−1], wherein E°$_{25}$ is the room-temperature elastic modulus of the ceramic in a hypothetical state of zero microcracking, determined by extrapolation to 25° C., of a tangent to the curve constructed through the elastic modulus data measured during cooling from 1200° C. A low value of Nb$^3$ corresponds to a low degree of microcracking.

Accordingly, the ratio of elastic modulus measured at about 800° C. during heating to the initial room temperature (25° C.) elastic modulus, E$_{800}$/E$_{25}$, may in certain embodiments be less than about 1.05, such as less than about 1.03, less than about 1.00, less than about 0.98, or less than about 0.96. Low values of Nb$^3$ and E$_{800}$/E$_{25}$ may correspond to relatively low levels of microcracking, which enable greater strength of the ceramic walls.

As used herein, a cordierite phase is defined as a phase having the crystalline structure of orthorhombic cordierite or hexagonal indialite, and comprised predominantly of the compound $Mg_2Al_4Si_5O_{18}$. As used herein, an aluminum titanate phase is defined as a phase having the crystalline structure of pseudobrookite, and comprised predominantly of the compounds $Al_2TiO_5$ and $MgTi_2O_5$. In certain embodiments, the pseudobrookite comprises from about 70% to about 100% $Al_2TiO_5$. As used herein, CMAT comprises about 40% to about 80% pseudobrookite, about 0% to about 30% cordierite, and about 0 to about 30% mullite, where pseudobrookite is defined as aluminum titanate or an aluminum titanate magnesium titanate solid solution.

In certain embodiments disclosed herein, the formed ceramic substrate predominantly comprises a pseudobrookite phase. In yet further embodiments, the formed ceramic substrate has a combined concentration of Na$_2$O and K$_2$O of less than about 0.4%, such as, for example, less about 0.2% or less than about 0.1%, washcoated with a zeolite catalyst such as Cu/CHA or Fe-ZSM-5, at a washcoat loading ranging from about 20 g/L to about 200 g/L.

The value of about 0.4% by weight of sodium oxide provides an upper limit on tolerable levels of alkali. This amount is determined by meeting the condition that the concentration of Na$_2$O in mol/L in the composite body is equal to or less than the concentration of CuO. The rational is as follows: zeolite with a Cu concentration of about 2%, washcoated to a loading of about 120 g/L onto a formed ceramic substrate with a density of about 500 g/L. This assumes complete ion exchange of Cu$^{2+}$ for 2 Na$^+$. A lower value such as about 25%, or in certain embodiments about 10%, of the maximum is recommended so that the composite body maintains good SCR performance over its lifetime.

The low alkali or alkaline earth metal formed ceramic substrate and composite body disclosed herein are advantageous in numerous ways. By way of example, the lifetime of a zeolite catalyst may be extended; the zeolite catalyst may operate at higher temperatures; the amount of catalyst required may be reduced; and transition metal components from the catalyst are not exchanged with components of the composite body or the formed ceramic substrate to change the composite body or substrate properties. Other objects and advantages of the embodiments disclosed herein will be apparent to those of ordinary skill in the art.

The disclosure also provides a method of making a formed ceramic substrate having less than about 1000 ppm sodium and at least about 55% porosity, such as at least about 60% porosity. In certain embodiments, the method entails mixing together the inorganic ceramic-forming raw materials with other ingredients known in the art that may, for example, comprise organic binders, plasticizers, lubricants, and fugitive pore formers. In certain embodiments disclosed therein, the inorganic and organic components may be mixed with a solvent phase to form a moldable compounded material, which is subsequently formed into a body, such as cellular body like a honeycomb body, by a process such as extrusion, although other forming processes such as casting or pressing may be used.

Also disclosed herein are batch compositions useful for producing an oxide-containing ceramic-forming green body. In particular, such batch compositions, when formed into green bodies and fired, may produce ceramic articles exhibiting a low elemental alkali or alkaline earth metal content, such as a low sodium content. Forming or shaping of the green body from the batch composition may be done by, for example, typical ceramic fabrication techniques, such as uniaxial or isostatic pressing, extrusion, slip casting, and injection molding. Extrusion, for example, may be used when the formed ceramic substrate is of a honeycomb geometry, such as for a catalytic converter flow-through substrate or a diesel particulate wall-flow filter.

The batch components and solvents for forming the batch composition may be selected such that the mass of alkali or alkaline earth metal contributed by the organic and inorganic constituents of the batch and the solvents, divided by the mass of the inorganic constituents of the batch, is less than about 1000 ppm, as expressed in the following equation:

$$\{\Sigma[(m_i)(w_{am,i})]+\Sigma[(m_o)(w_{am,o})]+\Sigma[(m_s)(w_{am,s})]\}\div\Sigma[(m_i)]<1\times10^{-3}$$

where $m_i$, $m_o$, and $m_s$ represent the mass (part by weight) of each inorganic, organic, and solvent component of the batch, respectively, and $w_{am,i}$, $w_{am,o}$, and $w_{am,s}$ represent the weight fractions of alkali or alkaline earth metal (expressed as the element) in each respective inorganic, organic, and solvent component.

The resulting green body may then be dried and fired to a temperature sufficient to remove the organic components, including the fugitive pore formers, and to sinter the inorganic powers to form a formed ceramic substrate. The amount of pore former material in the batch composition may be adjusted to provide the desired porosity, for example a porosity of at least about 60%. The particle size distributions of the inorganic and pore former materials may be selected by those of ordinary skill in the art to achieve the desire pore size distribution.

The resulting green bodies can be optionally dried, and then fired in a gas or electric kiln or by microwave heating, under conditions effective to convert the green body into a formed ceramic substrate. For example, the firing conditions effective to convert the green body into a formed ceramic substrate can comprise heating the green body at a maximum soak temperature in the range of from about 1250° C. to about 1450° C., such as from about 1300° C. to about 1350° C., and maintaining the maximum soak temperature for a hold time sufficient to convert the green body into a formed ceramic substrate, followed by cooling at a rate sufficient not to thermally shock the sintered article.

In certain other embodiments, the green body may be fired in multiple firing steps. For example, in certain methods of firing, the green body containing batch materials may be heated between room temperature and a top soak temperature, during which organics are removed from the green body and the resultant phases are formed. The firing conditions may be chosen such that the body does not undergo stresses exceeding its strength, providing a resultant body that is crack-free. Various firing cycles for different materials are well known in the art.

When the ceramic is chosen from a cordierite ceramic or an aluminum titanate ceramic, for example, raw materials may comprise, for example, titanium dioxide, talc, calcined talc, magnesium oxide, magnesium hydroxide, magnesium carbonate, magnesium aluminate spinel, alpha-alumina, boehmite, kaolin, calcined kaolin, quartz, fused silica, and other additives that are well known in the art. Aluminum trihydrate may be used, but should be selected from special sources of aluminum trihydrate having a lower sodium content than is typical of many commercially available aluminum trihydrate powders. Magnesium sources may contain less than about 0.30 wt % calcium oxide.

The organic binders and forming aids disclosed herein may include a methyl cellulose binder and a stearic acid lubricant. Sodium stearate, although known in the art as an organic lubricant, has a high concentration of sodium and thus may not be suitable for certain embodiments disclosed herein.

The pore former materials disclosed herein may include organic particulates possessing a low ash content, such as, for example, graphite, starch, nut shell flour, hard waxes, and other pore former materials known in the art. Starches may include any starch known in the art, such as cross-linked, native, and modified starches, including for example pea starches, potato starches, corn starches, and sago starches.

In certain embodiments disclosed herein, the raw materials envisioned for use in the formed ceramic substrate may be washed or chemically cleaned to lower their alkali or alkaline earth metal content to an amount suitable for use in the formed ceramic substrates disclosed herein.

Table A below shows exemplary alkali and alkaline earth metal contents for various known raw materials.

TABLE A

| Component | Element, ppm | | |
|---|---|---|---|
| | Na | K | Ca |
| Inorganics | | | |
| Alumina, Microgrit ® WCA25 | 3400 | 20 | 230 |
| Alumina, Almatis ® ACG15 | 800 | 10 | 210 |
| Titania, TiPure R101 | 130 | 1 | 0 |
| Titania, Hitox ® STD | 1800 | 0 | 110 |
| Talc, Cercron ® MB 96-67 | 300 | 40 | 1100 |
| Mg(OH)2, Magshield ® UF | 29 | 7 | 4074 |
| Silica, Microsil ® 4515 | 40 | 60 | 53 |
| $Y_2O_3$ | 50 | 20 | na |
| $CeO_2$, PIDC | 38 | 18 | 100 |
| Pore Formers | | | |
| Graphite, Ashbury 4566 | 200 | 20 | 210 |
| Native potato starch, Emsland | 30 | 900 | 106 |
| VHXL Potato Starch, Emsland F8684 | 2500 | 180 | 94 |
| VHXL Potato Starch, Emsland F8684O | 230 | 26 | 320 |
| VHXL Emselect 1000, Emsland F10153 | 570 | 63 | 480 |
| Bylina pea starch | 73 | 31 | 140 |
| XL pea starch, Emsland F9694 | 390 | 20 | 145 |
| VHXL pea starch, Emsland F10157 | 230 | 11 | 140 |
| XL Sago, Ingredion ® E910-55 | 55 | 6 | 240 |
| Polyethylene, Honeywell ACumist ® F45 | 2 | 1 | 9 |
| Extrusion Aids | | | |
| Fatty Acid | na | na | na |
| Binder: F240 | 3500 | 50 | na |
| Binder: TY11A | 2100 | 20 | na |

As used in the present disclosure, the term "formed substrate," and variations thereof, is intended to include ceramic, inorganic cement, and/or carbon-based bodies. Formed ceramic substrates include, but are not limited to, those comprised of cordierite, aluminum titanate, and fused silica. Inorganic cement substrates include, but are not limited to, those comprised of inorganic materials comprised of an oxide, sulfate, carbonate, or phosphate of a metal, including calcium oxide, calcium aluminate cements, calcium/magnesium sulfate cements, and calcium phosphate. Carbon-based materials include, but are not limited to, synthetic carbon-based polymeric material (which may be cured or uncured); activated carbon powder; charcoal powder; coal tar pitch; petroleum pitch; wood flour; cellulose and derivatives thereof; natural organic materials, such as wheat flour, wood flour, corn flour, nut-shell flour; starch; coke; coal; or mixtures thereof.

After preparation of the formed ceramic substrate, a catalyst composition may be added to the formed ceramic substrate in order to prepare a composite body. Composite bodies may have various uses, including, for example, as filters. A catalyst may be applied to the formed ceramic substrate in any way known in the art, including, for example, by washcoating the formed ceramic substrate with a catalyst. A catalyst may also be incorporated into the formed ceramic substrate as part of the batch composition to form a composite body.

In certain embodiments disclosed herein, the composite body undergoes thermal aging but still substantially maintains catalyst activity. In certain embodiments, catalytic activity may be measured by the nitric oxide conversion efficiency of the thermally aged composite body at a given temperature, such as, for example, at least about 200° C., such as at least about 350° C. In certain embodiments disclosed herein, the nitric oxide conversion efficiency may be greater than about 80%, such as greater than about 90%, or greater than about 95%.

As discussed above, a reduction in catalyst surface area on a substrate correlates to a reduction in its catalytic activity; likewise, the greater the percentage of BET surface area that can be maintained, the greater the catalytic activity that is maintained. For example, in certain embodiments, the composite body will maintain a BET surface area of at least about 55% after thermal aging. As used herein a substantially maintained BET surface area means a BET surface area retention of at least about 55%, such as at least about 60% or at least about 70%.

In other embodiments disclosed herein, thermal degradation of the composite body may not be solely responsible for the loss in filter efficiency observed at high alkali and alkaline earth metal concentrations. In accordance with certain embodiments disclosed herein, alkali and alkaline earth metal impurities may partition in the glass phase of the formed ceramic substrate, thus having a high mobility. It is theorized that solid-state ion exchange may take place between the formed ceramic substrate, where the alkali or alkaline earth metal in the glass phase is highly mobile, and the metal ions located in the catalyst, such as the copper in a Cu/CHA zeolite catalyst. The ion exchange may be stoichiometric.

The loss in active metal catalyst sites may be explained by a stoichiometric ion exchange between the alkali and alkaline earth metal ions located in the glass phase of the formed ceramic substrate and the metal ions located in the catalyst, as may be evidenced, for example, by microprobe analysis. Furthermore, the ion exchange may be a function of the initial alkali or alkaline earth metal oxide content in the formed ceramic substrate. Therefore, in certain embodiments according to the disclosure, there is a maximum acceptable limit for alkali or alkaline earth metal oxide concentration the formed ceramic substrate to minimize ion exchange reactions between the formed ceramic substrate and the active catalyst phase, thereby minimizing catalyst degradation under mild thermal aging conditions.

Thermal aging conditions used may include typical aging conditions known to those skilled in the art. In certain embodiments, the thermal aging conditions may include exposure to elevated temperatures, such as temperatures greater than about 700° C., and hydrothermal conditions, such as water vapor present in an amount ranging from about 1% to about 15%. In certain embodiments, thermal aging may be conducted in air at a constant flow rate of about 200 scfm and containing air with about 10% moisture, and heating the sample inside a furnace to about 800° C. for a sufficient amount of time. In certain embodiments, thermal aging may include a pre-conditioning step, such as pre-conditioning the sample at about 600° C. for about 5 hours in air with about 10% moisture.

Various reactors may be available to thermally age mixtures of catalyst powder, such as Cu/CHA catalyst powder and pulverized ceramic substrate in order to subsequently ascertain catalytic activity. Any reactor known in the art may be used. In certain embodiments, for example, air may flow through a mass flow controller (MFC) before proceeding into a humidifier. From the humidifier, the air then cycles through deionized water into a water pump and back into the humidifier. The air then flows through a tube furnace containing a vent at the end opposite the humidifier. The furnace further contains a sample, for example a sample comprising mixtures of catalyst powder and pulverized ceramic substrate, wherein the sample is contained between two pieces of quartz wool. The reactor functions to thermally age the sample as described above.

Also disclosed herein is a method of using a Cu/CHA zeolite coated substrate as a filter for the reduction of nitric oxide ($NO_x$) and other gaseous and particulate matter, wherein the product filter demonstrates superior filtering capabilities.

It is well within the ability of those skilled in the art to choose oxide-containing ceramic-forming material, pore former, solvent and other excipients to yield a formed ceramic substrate, such as a cordierite, aluminum titanate or fused silica body, having the desired properties.

Unless otherwise indicated, all numbers used in the specification and claims are to be understood as being modified in all instances by the term "about," whether or not so stated. It should also be understood that the precise numerical values used in the specification and claims form additional embodiments of the disclosure. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

It is to be understood that both the foregoing general description and the detailed description are exemplary and explanatory only and are not intended to be restrictive.

The accompanying drawings, which are incorporated in and constitute a part of this specification, are not intended to be restrictive, but rather illustrate embodiments of the disclosure.

Other embodiments will be apparent to those skilled in the art from consideration of the specification and practice of the disclosure.

EXAMPLES

The following examples are not intended to be limiting of the disclosure.

Example 1—Cordierite Substrate

In an effort to discover the chemical and/or physical properties of a cordierite honeycomb ceramic substrate that influence the retention of surface area of a Cu/CHA zeolite catalyst with which it is in contact, a large number of different cordierite samples spanning a range in chemical composition of minor metal oxide constituents, % porosity, and % glass, were selected. Each ceramic was crushed into a powder and mixed with a Cu/CHA zeolite catalyst powder in a weight ratio of about 4:1. Approximately 1.25 grams of the mixture was placed in a small reactor.

The thermal aging test was conducted in air at a constant flow rate of 200 scfm and containing 10 vol. % of water. The sample was heated inside the furnace to 800° C. for 64 hours. This thermal cycle is meant to simulate aging of the catalyst in an SCR-on-DPF application. After exposure in the furnace, the BET surface area of the aged mixture was measured using the nitrogen adsorption technique, and the BET surface area of the zeolite component of the mixture was computed from the value obtained for the zeolite plus substrate mixture, assuming the surface area contribution from the ceramic phase to be negligible. Reference measurements were also made with the fresh zeolite catalyst as well as with the zeolite catalyst aged without the presence of a substrate material.

Figure 2:
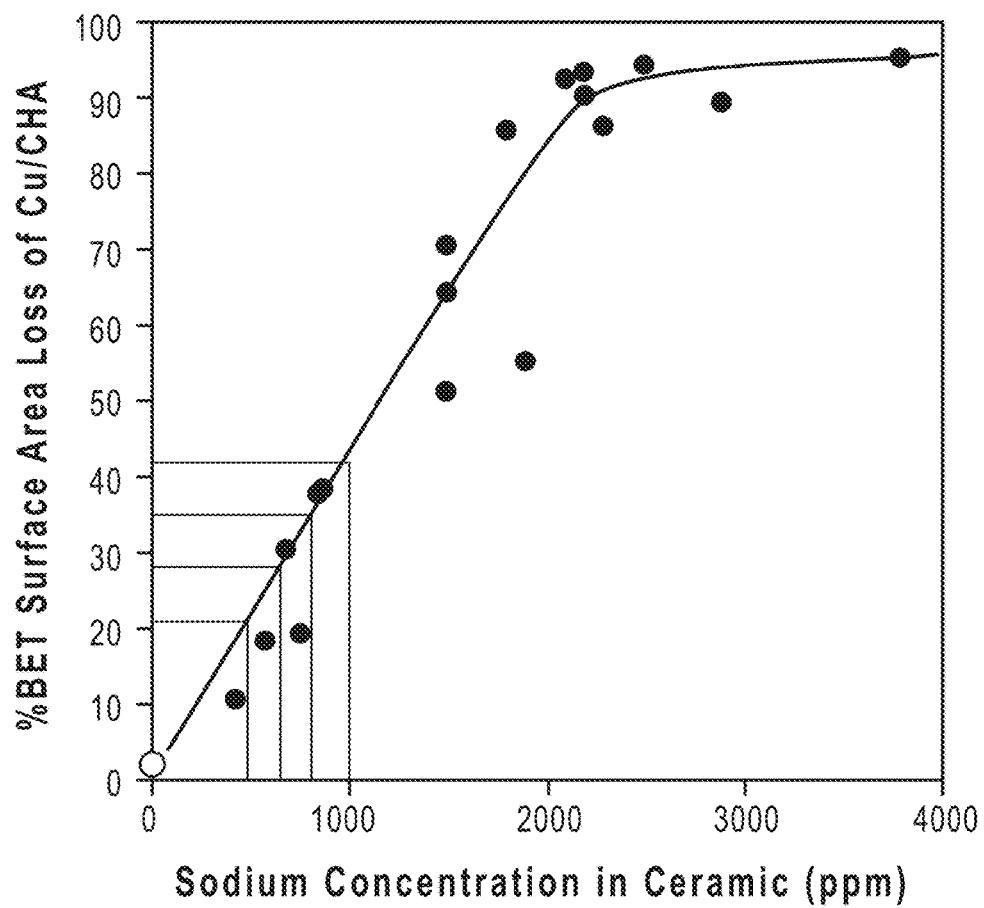
FIG. 2 shows percent BET surface area loss in Cu/CHA zeolite after thermal aging versus concentration of sodium in a cordierite ceramic powder with which the zeolite was admixed. Rectangular regions delineate certain embodiments of the disclosure, wherein the sodium concentration in the ceramic is less than about 1000 ppm, less than about 800 ppm, less than about 650 ppm, and less than about 500 ppm. The open circle denotes zeolite that was aged in the absence of a ceramic powder.

The chemical compositions of the different cordierite substrates and filter materials were analyzed using ICP, and the impurities and their amounts are provided in Table 1, along with the % porosity as measured by mercury porosimetry. Table 1 also provides the measured reduction in BET surface area of the zeolite. FIG. 1 shows the value of the determination coefficient, $R^2$, between the surface area loss of the Cu/CHA zeolite after thermal aging and the concentrations of each of the individual elements in the co-mixed ceramic. The surface area reduction of the Cu/CHA zeolite was discovered to have a strong correlation with the sodium (Na) content of the ceramic, yielding an $R^2$ value of 83%. The correlation between the zeolite surface area loss and the concentration of sodium in the ceramic is shown graphically in FIG. 2. Additionally, reactivity of the substrates was found to have a weaker correlation with the Ca and P concentrations in the ceramics.

Table 2 lists the chemical compositions, in weight percentages of the oxides, of raw materials used in the fabrication of Comparison Examples 12 and 18 and Inventive Examples 4, 6, and 7. It can be seen that the Micral 6000 aluminum trihydrate, cross-linked potato starch, and sodium stearate comprise significant sources of sodium to the ceramic-forming batch.

Table 3 lists the weight percentages of the raw materials used for Comparison Examples 12 and 18 and Inventive Examples 4, 6, and 7.

Table 4 lists additional details on the physical properties of Comparison Examples 12 and 18 and Inventive Examples 4, 6, and 7.

The use of sodium stearate, a high-sodium aluminum trihydrate, and a high-sodium potato starch in the raw material mixture used to form Comparative Example 18 resulted in a sodium content in the fired ceramic body of 2900 ppm. This high sodium concentration in the ceramic resulted in an 89% surface area loss of the Cu/CHA zeolite in a powder mixture with the ceramic after the thermal aging treatment.

The replacement of sodium stearate by stearic acid in Comparative Example 12 resulted in a reduction in sodium concentration in the fired ware to 1900 ppm. The surface area loss in the Cu/CHA after thermal aging was reduced to 55%, but was still undesirably high.

Inventive Example 6 utilized the same raw materials as Comparative Example 12 except that the high-sodium aluminum trihydrate was replaced with lower-sodium alpha-alumina. The sodium content of the fired body was thereby further reduced to 840 ppm, and the surface area loss of the Cu/CHA zeolite after thermal aging was decreased to only 38%. A porosity of 64% and a narrow pore size distribution provide a pore microstructure capable of maintaining a low filter pressure drop even with a high loading of zeolite catalyst in the pores of the filter walls.

Inventive Examples 4 and 7 illustrate the use of other low-sodium raw materials to achieve fired ceramic substrates having less than about 1000 ppm sodium, thereby preserving a useful surface area and activity in the Cu/CHA zeolite catalyst in contact with the ceramic. Examples 4 and 7 further illustrate ceramics having greater than about 60% porosity and narrow pore size distribution, but with finer median pore diameters that allow high filtration efficiency to be maintained in filters having thinner walls.

Table 1 shows percent loss in BET surface area of zeolite after thermal aging, alone (Ex. 1) and mixed with cordierite ceramic powders (Ex. 2-19), and % porosity and concentrations of minor and trace elements in ceramics. Asterisks indicate inventive examples.

Table 2 shows the chemical compositions of raw materials used in selected examples 4, 6, 7, 12, and 18 of Table 1 (weight percentages).

TABLE 1

| Ex. No. | % Surface Area Loss | Na | Ba | Ca | Ce | Co | Cr | Fe | K | La | Mn | Ni | P | Sr | Ti | V | Y | Zn | Zr | % Porosity in ceramic |
|---|---|---|---|---|---|---|---|---|---|---|---|---|---|---|---|---|---|---|---|---|
| 1 (Cu/CHA) | 2 | 0 | 0 | 0 | 0 | 0 | 0 | 0 | 0 | 0 | 0 | 0 | 0 | 0 | 0 | 0 | 0 | 0 | 0 | — |
| 2 | 10 | 430 | 46 | 620 | 47 | 3.4 | 45 | 2800 | 240 | 23 | 27 | 14 | 200 | 43 | 3900 | 73 | 3.6 | 6.1 | 34 | 35 |
| 3 | 18 | 580 | 27 | 540 | 20 | 2.7 | 22 | 3100 | 240 | 8.7 | 38 | 17 | 130 | 35 | 1400 | 32 | 73 | 6.1 | 24 | — |
| 4 | 30 | 690 | 18 | — | 10 | 1.4 | 28 | 170 | 230 | 1400 | 26 | 16 | 220 | 66 | 1400 | 43 | 5.9 | 7.2 | 27 | 61 |
| 6 | 38 | 840 | 14 | 430 | 5.3 | 49 | 200 | 7200 | 150 | 4.5 | 19 | 1500 | 210 | 70 | 1200 | 27 | 4300 | 11 | 40 | 66 |

TABLE 1-continued

| Ex. No. | % Surface Area Loss | Na | Ba | Ca | Ce | Co | Cr | Fe | K | La | Mn | Ni | P | Sr | Ti | V | Y | Zn | Zr | % Porosity in ceramic |
|---|---|---|---|---|---|---|---|---|---|---|---|---|---|---|---|---|---|---|---|---|
| 7 | 38 | 880 | 20 | — | 11 | 20 | 160 | 330 | 1200 | 8.4 | 32 | 620 | 200 | 66 | 1400 | 53 | 8500 | 10 | 36 | 66 |
| 8 | 51 | 1500 | 9.7 | 330 | 6.4 | 46 | 200 | 7200 | 110 | 2.6 | 17 | 1400 | 30 | 3.8 | 1000 | 21 | 3.2 | 16 | 31 | 47 |
| 9 | 64 | 1500 | 9.7 | 330 | 6.4 | 46 | 200 | 7200 | 110 | 2.6 | 17 | 1400 | 30 | 3.8 | 1000 | 21 | 3.2 | 16 | 31 | 47 |
| 10 | 70 | 1500 | 16 | 650 | 15 | 2.4 | 28 | 3500 | 510 | 7 | 24 | 39 | 210 | 6.7 | 1500 | 31 | 4000 | 12 | 28 | 66 |
| 11 | 85 | 1800 | 11 | 420 | 7.5 | 44 | 210 | 7100 | 230 | 3.1 | 21 | 1400 | 180 | 4.8 | 990 | 23 | 3900 | 16 | 33 | 65 |
| 12 | 55 | 1900 | 16 | 460 | 6.1 | 47 | 230 | 7100 | 250 | 4.8 | 20 | 1400 | 260 | 81 | 1400 | 34 | 5300 | 21 | 42 | 68 |
| 13 | 92 | 2100 | 32 | 790 | 12 | 2.2 | 33 | 2500 | 240 | 7 | 32 | 59 | 350 | 55 | 1000 | 33 | 7.9 | 7.8 | 53 | 66 |
| 14 | 90 | 2200 | 14 | 450 | 33 | 59 | 180 | 8000 | 120 | 4.6 | 24 | 1200 | 230 | 4.9 | 910 | 27 | 4500 | 19 | 54 | 63 |
| 15 | 93 | 2200 | 21 | 610 | 20 | 19 | 24 | 2600 | 110 | 11 | 27 | 16 | 1300 | 8.7 | 1200 | 38 | 1.9 | 6.4 | 23 | 64 |
| 16 | 86 | 2300 | 25 | 980 | 1 | 1.8 | 28 | 2600 | 810 | 1300 | 34 | 70 | 110 | 45 | 1200 | 31 | 0 | 5.1 | 19 | 63 |
| 17 | 94 | 2500 | 42 | 1100 | 1.6 | 24 | 150 | 3900 | 310 | 1400 | 54 | 800 | 320 | 49 | 1100 | 32 | 1.2 | 18 | 42 | 68 |
| 18 | 89 | 2900 | 18 | 460 | 6.2 | 48 | 250 | 6800 | 290 | 4.8 | 20 | 1500 | 260 | 78 | 1400 | 36 | 4900 | 24 | 38 | 65 |
| 19 | 95 | 3800 | 45 | 1600 | 4 | 26 | 160 | 4100 | 370 | 2300 | 54 | 850 | 600 | 140 | 1300 | 41 | 3 | 19 | 60 | 68 |

TABLE 2

|  | MgO | Al$_2$O$_3$ | SiO$_2$ | Fe$_2$O$_3$ | TiO$_2$ | Na$_2$O | K$_2$O | CaO | NiO | Cr$_2$O$_3$ | P$_2$O$_5$ |
|---|---|---|---|---|---|---|---|---|---|---|---|
| FCOR Talc | 30.14 | 0.19 | 60.60 | 2.32 | 0.00 | 0.010 | 0.00 | 0.120 | 0.48 | 0.00 | 0.00 |
| Luzenac Jetfil 500 Talc | 30.13 | 0.19 | 59.40 | 2.55 | 0.000 | 0.010 | 0.00 | 0.230 | 0.45 | 0.12 | 0.00 |
| Magshield UF Magnesium Hydroxide | 68.21 | 0.09 | 0.29 | 0.140 | 0.006 | 0.000 | 0.000 | 0.760 | 0.00 | 0.00 | 0.00 |
| A10 Alumina | 0.00 | 99.90 | 0.036 | 0.014 | 0.00 | 0.015 | 0.005 | 0.033 | 0.00 | 0.00 | 0.00 |
| HVA Alumina | 0.00 | 99.90 | 0.008 | 0.014 | 0.00 | 0.067 | 0.005 | 0.010 | 0.00 | 0.00 | 0.00 |
| Boehmite | 0.00 | 79.99 | 0.00 | 0.000 | 0.000 | 0.004 | 0.005 | 0.000 | 0.00 | 0.00 | 0.00 |
| Micral 6000 Aluminum Trihydrate | 0.002 | 64.90 | 0.006 | 0.005 | 0.00 | 0.202 | 0.001 | 0.024 | 0.00 | 0.00 | 0.00 |
| CHC-94 Kaolin | 0.07 | 38.18 | 45.10 | 0.210 | 0.990 | 0.070 | 0.040 | 0.050 | 0.00 | 0.00 | 0.05 |
| Cerasil 300 Quartz | 0.002 | 0.055 | 99.87 | 0.014 | 0.006 | 0.042 | 0.008 | 0.005 | 0.00 | 0.00 | 0.00 |
| Imsil A25 Quartz | 0.008 | 0.260 | 99.52 | 0.047 | 0.018 | 0.076 | 0.042 | 0.009 | 0.00 | 0.00 | 0.019 |
| Cross-Linked Potato Starch | 0.003 | 0.00 | 0.005 | 0.00 | 0.00 | 0.270 | 0.020 | 0.014 | 0.00 | 0.00 | 0.087 |
| Rice Starch | 0.013 | 0.00 | 0.012 | 0.00 | 0.00 | 0.116 | 0.016 | 0.002 | 0.00 | 0.00 | 0.099 |
| Walnut Shell Flour | 0.040 | 0.00 | 0.015 | 0.00 | 0.00 | 0.002 | 0.002 | 0.154 | 0.00 | 0.00 | 0.032 |
| 4602 Graphite | 0.00 | 0.047 | 0.092 | 0.500 | 0.019 | 0.00 | 0.00 | 0.025 | 0.00 | 0.00 | 0.00 |
| 4014 Graphite | — | — | — | — | — | — | — | — | — | — | — |
| Sodium Stearate | 0.00 | 0.00 | 0.00 | 0.00 | 0.00 | 10.11 | 0.00 | 0.00 | 0.00 | 0.00 | 0.00 |
| Stearic Acid | — | — | — | — | — | — | — | — | — | — | — |
| Durasyn 162 Polyalphaolefin | — | — | — | — | — | — | — | — | — | — | — |
| Tall Oil | — | — | — | — | — | — | — | — | — | — | — |
| Methyl Cellulose | 0.004 | 0.00 | 0.001 | 0.00 | 0.00 | 0.004 | 0.00 | 0.00 | 0.00 | 0.00 | 0.00 |

TABLE 3

Raw material combinations used in selected examples of Table 1

| Raw Material | 18 Comp. | 12 Comp. | 6 Inv. | 7 Inv. | 4 Inv. |
|---|---|---|---|---|---|
| Luzenac FCOR Talc | 38.52 | 38.52 | 42.80 | — | — |
| Luzenac Jetfil 500 Talc | — | — | — | 14.35 | — |
| Magshield UF Magnesium Hydroxide | — | — | — | 12.00 | 18.77 |
| A10 Aumina | 12.27 | 12.27 | 12.27 | — | — |
| HVA Alumina | — | — | 15.61 | 26.23 | 28.87 |
| Boehmite | — | — | — | — | 5.00 |
| Micral 6000 Aluminum Trihydrate | 20.99 | 20.99 | — | — | — |
| CHC-94 Kaolin | 12.84 | 12.84 | 12.84 | 16.00 | — |
| Cerasil 300 Quartz | 15.38 | 15.38 | 16.48 | — | — |
| Imsil A25 Quartz | — | — | — | 31.42 | 47.36 |
| Cross-Linked Potato Starch | 22.00 | 22.00 | 22.00 | — | — |
| Rice Starch | — | — | — | — | 15.00 |
| Walnut Shell Flour | — | — | — | 30.00 | — |
| 4602 Graphite | 22.00 | 22.00 | 22.00 | 15.00 | — |
| 4014 Graphite | — | — | — | — | 15.00 |
| Methyl Cellulose | 7.00 | 7.00 | 7.00 | 6.00 | 6.00 |
| Sodium Stearate | 1.00 | — | — | — | — |
| Stearic Acid | — | 0.70 | 0.70 | — | — |
| Durasyn 162 Polyalphaolefin | — | — | — | 4.60 | 4.60 |
| Tall Oil | — | — | — | 0.60 | 0.60 |
| Yttrium Oxide | 0.40 | 0.40 | 0.40 | 1.00 | — |
| Lanthanum Oxide | — | — | — | — | 1.00 |

TABLE 4

Properties of selected examples from Table 1

| | 18 | 12 | 6 | 7 | 4 |
|---|---|---|---|---|---|
| Pore Volume (ml/g) | 0.7407 | 0.7962 | 0.7840 | 0.7439 | 0.6031 |
| % Porosity | 64.6 | 67.5 | 64.4 | 65.6 | 60.8 |
| $d_1$ | 7.5 | 6.4 | 5.5 | 4.1 | 3.7 |
| $d_2$ | 8.9 | 9.0 | 6.9 | 4.9 | 4.2 |
| $d_5$ | 11.5 | 11.9 | 9.4 | 6.2 | 4.9 |
| $d_{10}$ | 14.0 | 14.8 | 12.6 | 7.6 | 5.7 |
| $d_{25}$ | 18.1 | 19.2 | 17.9 | 10.3 | 7.5 |
| $d_{50}$ | 22.2 | 23.6 | 23.2 | 12.7 | 9.5 |
| $d_{75}$ | 27.0 | 29.0 | 29.1 | 15.1 | 11.6 |
| $d_{90}$ | 40.4 | 44.8 | 44.1 | 19.7 | 16.8 |
| $d_{95}$ | 62.0 | 72.6 | 77.5 | 30.9 | 40.1 |
| $d_{98}$ | 122.0 | 144.3 | 166.5 | 94.0 | 141.2 |
| $d_{99}$ | 176.7 | 206.6 | 234.0 | 158.4 | 230.2 |
| $(d_{50} - d_{10})/d_{50} = d_f$ | 0.37 | 0.37 | 0.46 | 0.40 | 0.40 |
| $(d_{90} - d_{50})/d_{50} = d_c$ | 0.82 | 0.90 | 0.90 | 0.55 | 0.78 |
| $(d_{90} - d_{10})/d_{50} = d_b$ | 1.19 | 1.27 | 1.36 | 0.95 | 1.17 |
| $CTE_{25-800}$ ($10^{-7}/°$ C.) | 13.6 | — | 13.4 | 15.9 | 14.4 |
| $CTE_{200-1000}$ ($10^{-7}/°$ C.) | 17.6 | — | 17.3 | 20.5 | 19.1 |
| $CTE_{500-900}$ ($10^{-7}/°$ C.) | 20.8 | — | 20.6 | 23.1 | 21.5 |
| $CTE_{25-1000}$ ($10^{-7}/°$ C.) | 14.7 | — | 14.3 | 17.6 | 16.1 |
| Axial I-ratio | 0.57 | — | 0.59 | 0.63 | 0.53 |
| Powder I-ratio | 0.64 | — | 0.65 | 0.64 | 0.64 |
| Transverse I-ratio | 0.75 | — | 0.74 | 0.69 | 0.81 |
| % Mullite | 0.8 | 1.3 | 0 | 0 | 0 |
| % Spinel | 1.3 | 2.0 | 1.0 | 0.9 | 1.5 |
| % Alumina | 0 | 0 | 0 | 0 | 0 |
| MOR (psi) | 674 | — | 369 | 516 | 427 |
| E at 25° C. ($10^6$ psi) | 0.453 | — | 0.290 | 0.264 | 0.296 |
| E at 800° C. ($10^6$ psi) | 0.431 | — | 0.278 | — | 0.280 |
| E at 900° C. ($10^6$ psi) | 0.427 | — | 0.270 | 0.243 | 0.272 |
| E at 1000° C. ($10^6$ psi) | 0.430 | — | 0.277 | 0.217 | 0.246 |
| E(800)/E(25) | 0.951 | — | 0.959 | — | 0.946 |
| E(900)/E(25) | 0.943 | — | 0.931 | 0.920 | 0.919 |
| E(1000)/E(25) | 0.949 | — | 0.955 | 0.822 | 0.831 |
| Microcrack Index, $Nb^3$ | 0.037 | — | 0.045 | 0.006 | 0.018 |
| Bulk Density (g cm$^{-3}$) | 0.372 | — | 0.363 | 0.326 | 0.284 |
| Closed Frontal Area Fraction, CFA | 0.418 | — | 0.406 | 0.377 | 0.288 |
| MOR/CFA (psi) | 1610 | — | 908 | 1369 | 1482 |
| E/CFA ($10^6$ psi) | 1.08 | — | 0.714 | 0.700 | 1.03 |
| MOR/E | 0.149% | — | 0.127% | 0.196% | 0.144% |
| $TSP_{500}$ = MOR/[(E)($CTE_{500-900}$)] (° C.) | 715 | — | 619 | 846 | 671 |
| $TSL_{500} = TSP_{500} + 500$ (° C.) | 1215 | — | 1119 | 1346 | 1171 |
| $TSP_{200}$ = MOR/[(E)($CTE_{200-1000}$)] (° C.) | 844 | — | 736 | 956 | 756 |
| $TSL_{200} = TSP_{200} + 200$ (° C.) | 1044 | — | 936 | 1156 | 956 |
| Measured elemental Na (ppm) | 2900 | 1900 | 840 | 880 | 690 |
| B.E.T. Surface Area Loss | 89% | 55% | 38% | 38% | 30% |

Example 2—AT Substrate

Three coated aluminum titanate high-porosity (AT HP) compositions C1, C2, and C3 were prepared containing different alkaline oxide levels for Na$_2$O and K$_2$O. The AT HP compositions were prepared in the form of cellular ceramic honeycombs by routine extrusion processes, and their formulations are displayed in Table 5, below.

TABLE 5

Exemplary aluminum titanate based filter compositions

| | Compositions | | |
|---|---|---|---|
| Raw Materials | C1 | C2 | C3 |
| Inorganics | | | |
| Aluminum Oxide - A10 | — | — | 49.67 |
| Aluminum Oxide - Microgrit WCA 25 | 44.18 | — | — |
| Aluminum Oxide - SG3A | — | 44.18 | — |
| Titanium Dioxide - TiPure R101 | 33.53 | 33.52 | 30.33 |
| Talc - Cercron MB 96-67 | 19.10 | 19.10 | — |
| Silica - Microsil 4515 - -200 mesh | 2.71 | 2.71 | 10.31 |
| Strontium carbonate - Type DF | — | — | 8.1 |
| Calcium carbonate - HydroCarb-OG | — | — | 1.39 |
| Lanthanum Oxide - 5205 | — | — | 0.2 |
| Yttrium Oxide - Grade C | 0.49 | 0.49 | — |
| Pore formers | | | |
| Native Potato Starch | 27.00 | 32 | — |
| Cross-linked pea starch - F9492 | — | — | 19 |
| Synthetic Graphite - 4566 | 8.00 | 14 | 8 |
| Binder | | | |
| Hydroxypropyl Methylcellulose - TY11A | 3.00 | 3.00 | 3.00 |

TABLE 5-continued

Exemplary aluminum titanate based filter compositions

| | Compositions | | |
|---|---|---|---|
| Raw Materials | C1 | C2 | C3 |
| Hydroxypropyl Methylcellulose - F240 LF | 1.50 | 1.50 | 1.50 |
| Lubricants | | | |
| Fatty Acid, Tall Oil - L-5 | 1.00 | 1.00 | 1.00 |
| Firing Conditions | | | |
| Temperature (° C.) | 1355 | 1352 | 1427 |
| Soak time (hr) | 16 | 16 | 16 |
| Properties | | | |
| Porosity (%) | 54.87 | 60.63 | 57.5 |
| Mean pore diameter (μm) | 18.98 | 18.525 | 16.8 |
| Thermal expansion coefficient to 800° C. (ppm/° C.) | 1.05 | 1.06 | 0.28 |

Figure 3:
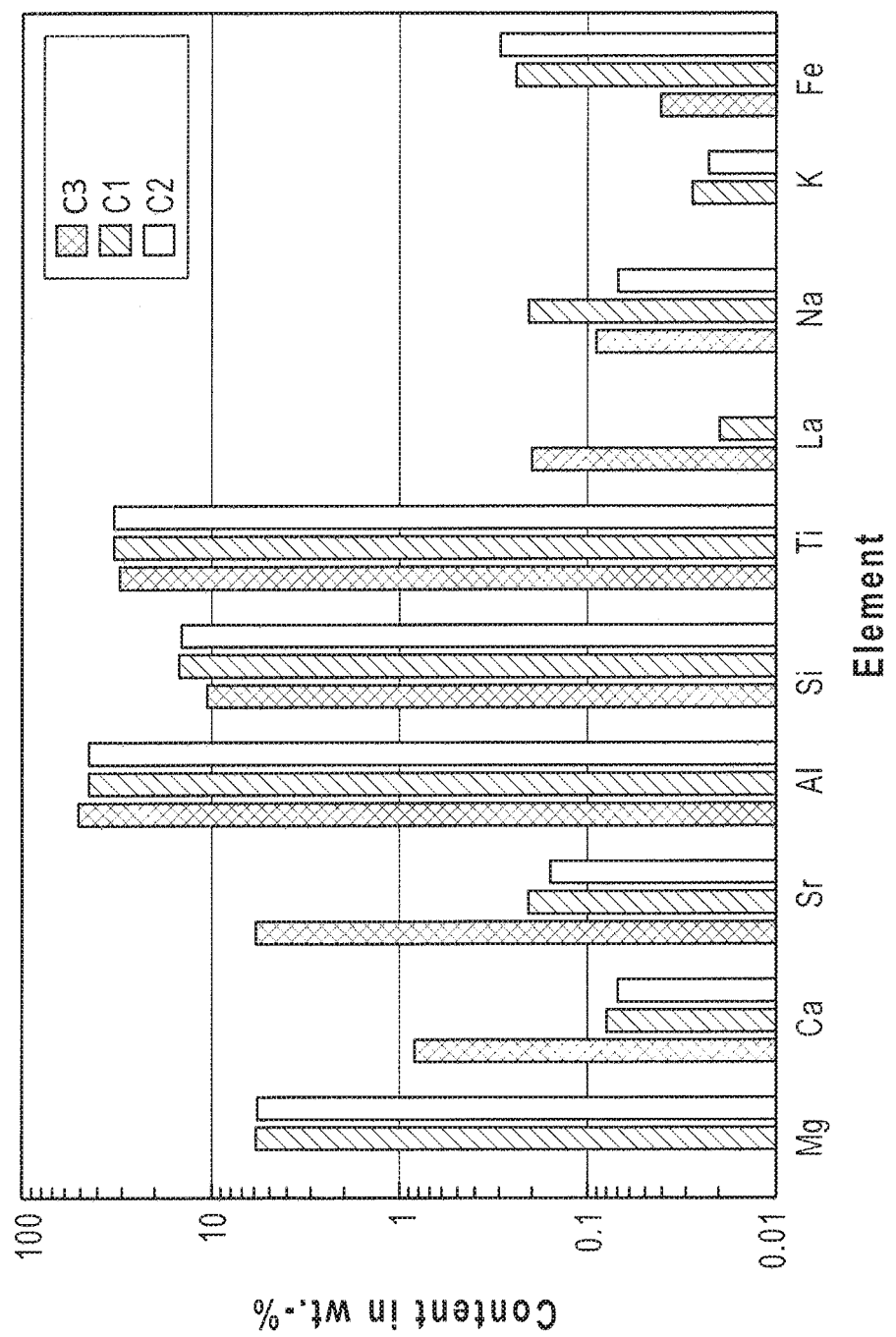
FIG. 3 is a bar graph showing the concentration of each of the individual elements in three aluminum titanate ceramic examples.

The chemical compositions of the fired ceramics were determined prior to catalyzation by ICP and XRF and are listed in FIG. 3. The two compositions C1 and C2 have similar chemical compositions except for their $Na_2O$ and $K_2O$ levels. This is mostly due to the level of alkaline oxides provided by the alumina used in the batch material. Table 6 provides the values for $Na_2O$ and $K_2O$ for each sample C1, C2 and C3. In addition, the washcoat loadings for the SCR testing of these three compositions are displayed in Table 6 below.

TABLE 6

$Na_2O$ and $K_2O$ values and washcoat loading of AT HP samples

| Sample | Washcoat Load in g/L | $Na_2O$ in wt % | $K_2O$ in wt % |
|---|---|---|---|
| C1 | 75 | 2100 | 280 |
| C2 | 79 | 700 | 230 |
| C3 | 67 | 900 | 0 | samples were coated with a Cu/CHA coating located in the porous walls of the filter material. All the data therefore also provide an indication of the behavior of a commercial catalyst technology under similar aging conditions. Even though the same coating technique was used to catalyze all of the samples, the washcoat loading varied somewhat. It was, however, considered close enough to measure effects caused by different $Na_2O$ and $K_2O$ levels, especially since the washcoat loadings for C1 and C2 were very close. All samples were coated as 2×5.5" cores and were cut to a 4" length for catalytic activity testing.

SCR Performance Data:

The SCR activity for all compositions with different $Na_2O$ and $K_2O$ levels were measured on a lab-scale reactor using the standard SCR reaction: $4NH_3+4NO \rightarrow 4N_2+6H_2O$. The SCR reaction conditions were chosen in a way to have a test setup able to measure the performance differences on the various samples. For example, the gas compositions contained 500 ppm NO: 650 ppm $NH_3$ and a space velocity of 70.000 h$^{-1}$ for samples in 2×4" was used. The temperature range for SCR performance evaluation used for this example was 225 to 525° C.

Two thermal aging procedures were applied prior to SCR performance testing. A pre-conditioning step at 600° C./5 hours in air with 10% moisture was used prior to the initial SCR testing. After SCR testing the samples were thermally aged at 800° C./5 hours, also using air with 10% moisture, followed by a second SCR performance test under the same conditions already used for the "fresh" evaluation.

Figure 4A:
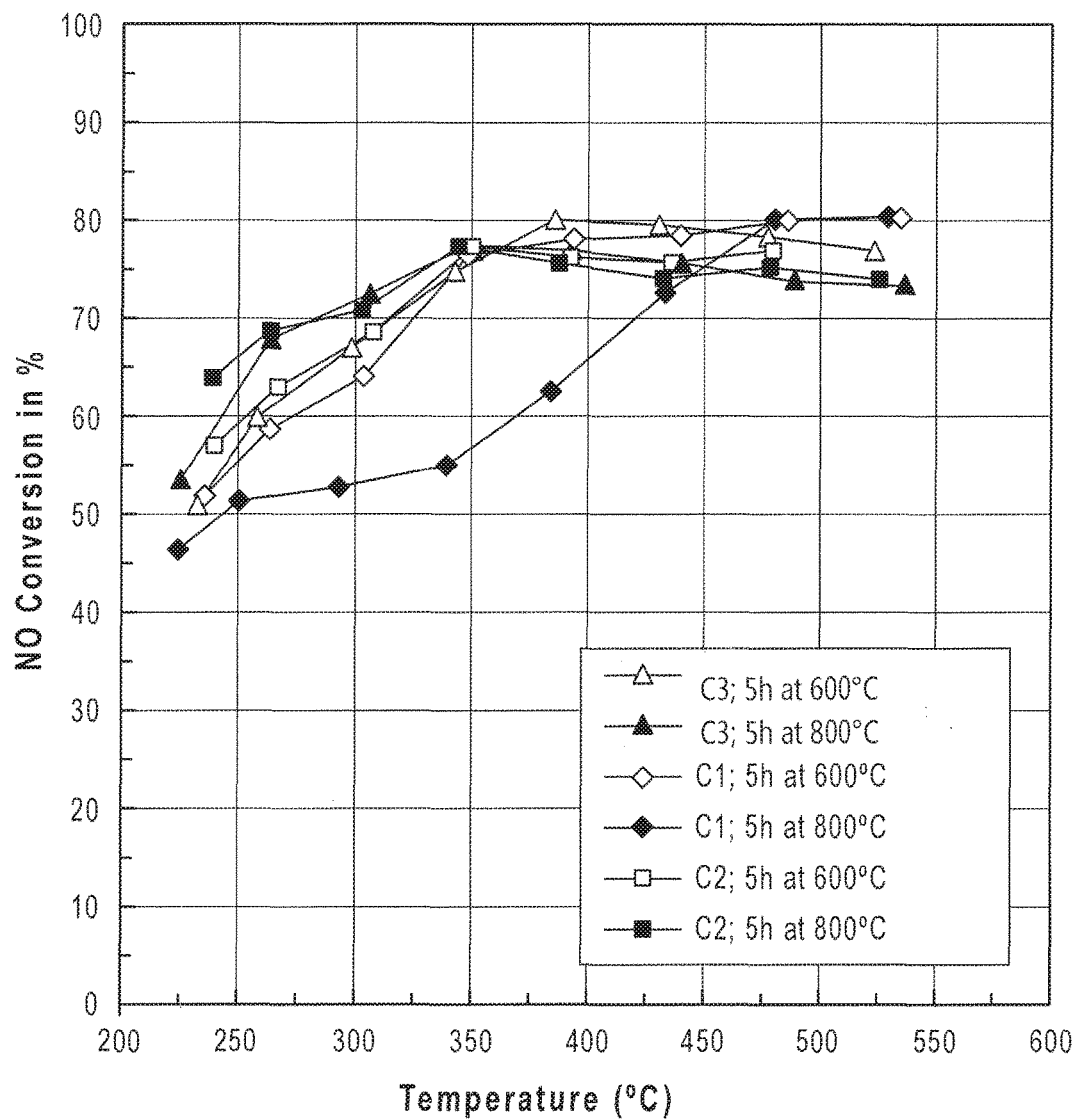
FIG. 4A is a graph illustrating NO conversion as a function of reaction temperature.

FIG. 4A shows absolute NO conversion efficiencies obtained on two AT HP compositions C1 and C2 containing different levels of $Na_2O$ and $K_2O$. In addition, composition C3 is also shown on FIG. 4A. For all materials, the SCR performance after pre-conditioning and after thermal aging are shown as a function of the reaction temperature.

The SCR performance after pre-conditioning for all samples was considered similar, giving the measurement error and the somewhat different washcoat loadings.

Figure 4B:
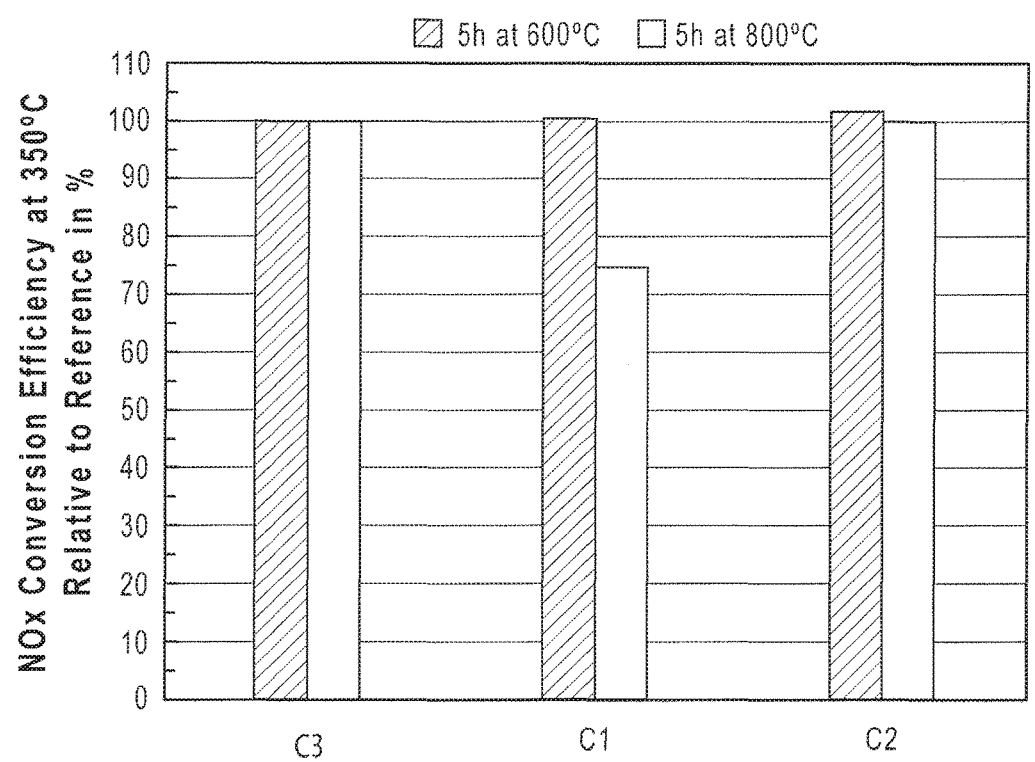
FIG. 4B is a bar graph illustrating NO conversion efficiency at 350° C. for the compositions C1 and C2 relative to the reference composition, C3.

After thermal aging, the C3 and the C2 samples still show only a minor effect of catalyst aging on SCR performance indicated by a similar NO conversion efficiency as a function of reaction temperature. The C1 sample shows a strong decrease in catalytic activity in the temperature range from 200° C. to 450° C. FIG. 4B is a comparison of the NO conversion efficiency relative to the composition C3 at 350° C. indicating a loss in activity for composition C1 in the range of about 25%.

To determine the root cause for this loss in catalytic activity, samples were prepared for XRD Rietveld analysis to determine if this catalyst degradation was caused by a thermal deterioration of the zeolite structure, which would then no longer be available for NO conversion. Similar studies have also been performed for cordierite compositions with different Na levels and Cu-containing zeolites.

Figure 5:
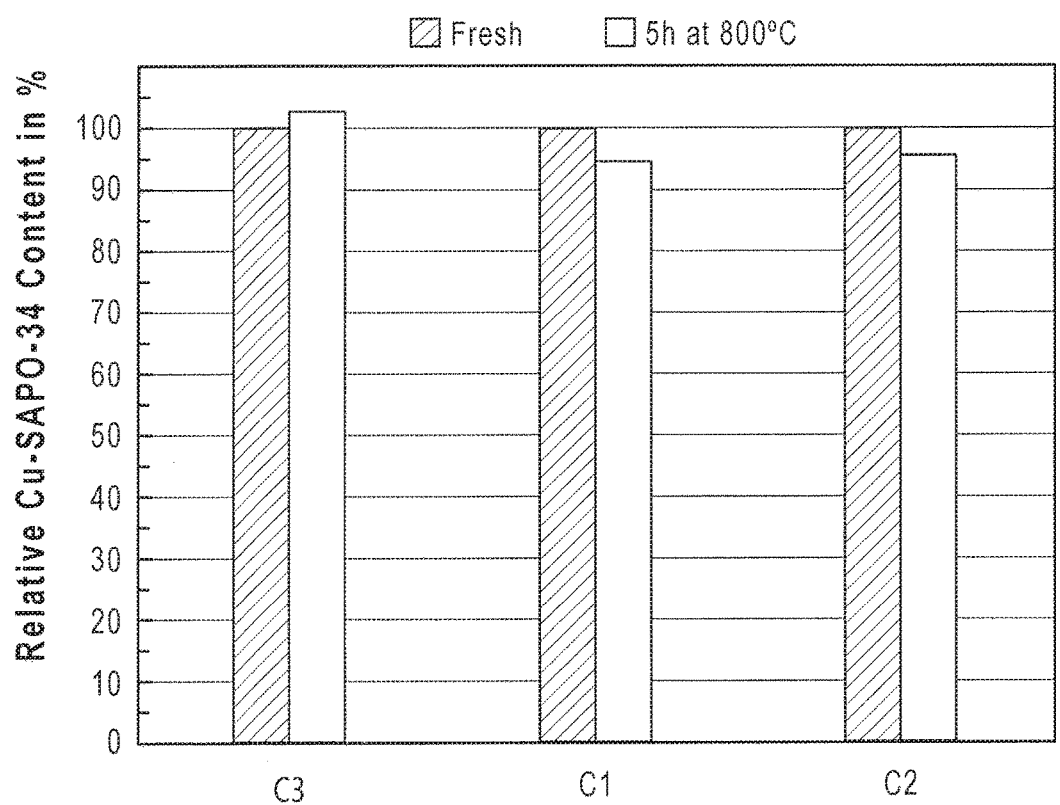
FIG. 5 is a bar graph illustrating XRD Rietveld results for fresh and thermally aged compositions to determine the Cu-SAPO-34 zeolite content.

A powder mixture of 4 g filter material and 1 g dried zeolite was carefully mixed, and part of this mixture was thermally aged in air with 10% moisture at 800° C./5 hours, similar to the aging procedure for the samples used for the SCR performance evaluation. After aging, both the fresh and the aged samples were analyzed for zeolite content using XRD Rietveld refinement. The results are shown in FIG. 5, where the relative Cu/CHA content is compared for both the fresh and aged samples. Essentially no loss in zeolite structure was found. Therefore, a thermal degradation of the zeolite structure may be excluded and is probably not the root cause for the strong loss in NO conversion efficiency observed.

Figure 6:
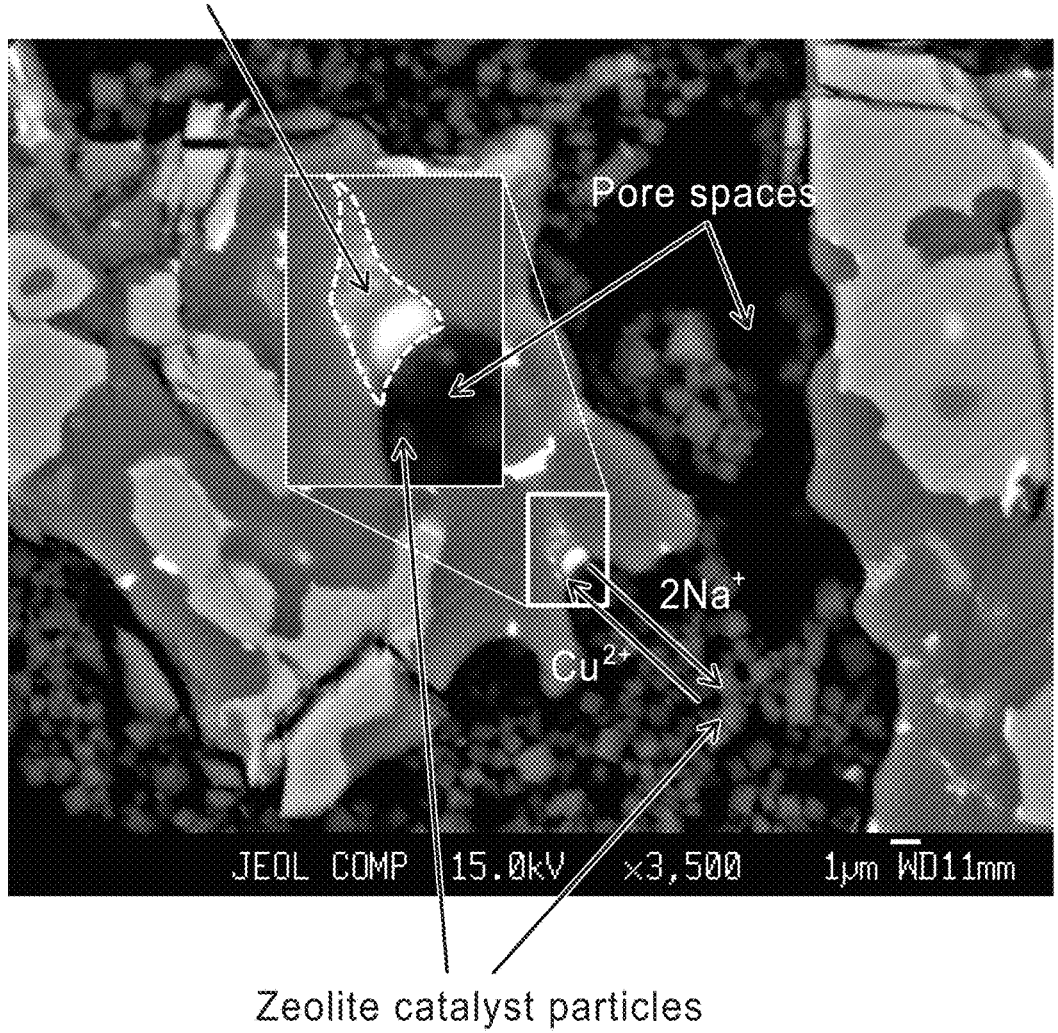
FIG. 6 is a scanning electron micrograph showing a region of sodium-containing glass (dark pocket) adjacent to copper-containing zeolite catalyst (bright area).

Therefore, additional analysis was performed on these samples. Microprobe studies on the SCR catalyst system were performed after pre-conditioning (600° C./5 hours in air with 10% moisture) and thermal aging (800° C./5 hours in air with 10% moisture). All samples were analyzed for Na and Cu content in the areas where the zeolite coating was located. FIG. 6 is a scanning electron micrograph from the microprobe study showing a region of sodium-containing glass (shown as the dark pocket in FIG. 6) adjacent to copper-containing zeolite catalyst (shown as the bright area in FIG. 6).

According to earlier studies with similar ceramic materials, sodium impurities may strongly partition in the glass phase of these materials having a high mobility. The microprobe studies indicate that a solid-state ion exchange took place between the ceramic material, where the sodium in the glass phase is highly mobile, and the copper ions located in the zeolite structure.

Figure 7:
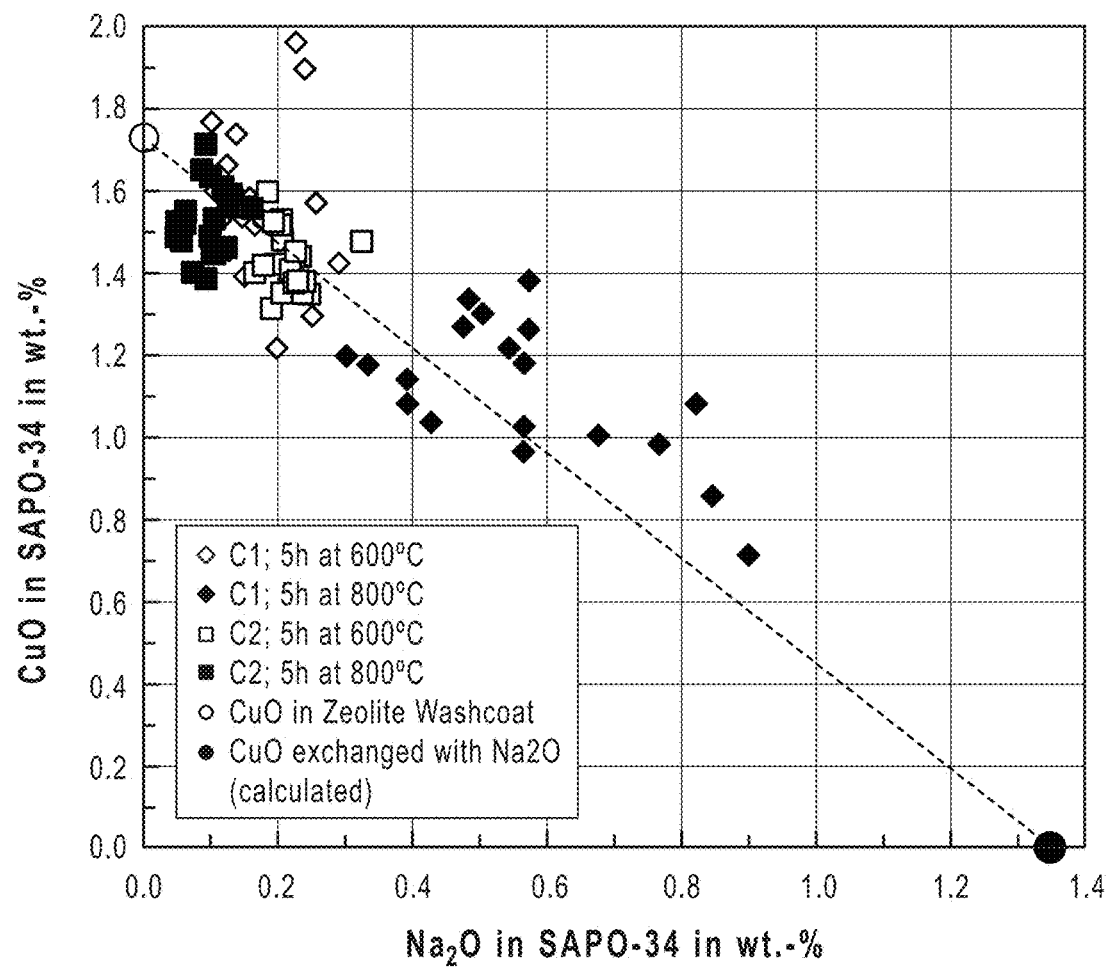
FIG. 7 is a graph showing the concentration of CuO in a SAPO-34 zeolite washcoat versus the concentration of $Na_2O$ in the same zeolite washcoat for examples C1 and C2, aged at 600 or 800° C. for 5 hours, as determined by electron probe microanalysis of various locations within the samples. Also shown for comparison is the concentration of CuO in the SAPO-34 zeolite washcoat before thermal aging in the presence of a ceramic substrate, and the projected composition of the same zeolite washcoat after complete exchange of sodium for copper. SAPO-34 is a small-pore molecular sieve with chabazite structure, and may be referred to as a zeolite chabazite catalyst.

The results are displayed in FIG. 7. After 600° C./5 hours, no ion exchange between the filter matrix and the Cu/CHA was detected, indicated by the low sodium and the high copper content in the zeolite phase. After thermal aging at 800° C., ion exchange took place for sample C1, containing around 2100 ppm $Na_2O$ (higher sodium level). Sample C2, which had a much lower $Na_2O$ level, did not show a high exchange rate between $Na^+$ and $Cu^{2+}$, after thermal aging at 800° C./5 hours.

Since the exchange was stoichiometric (movement of $Cu^{2+}$ tied to $Na^+$ at 800° C./5 hours), as also indicated by FIG. 7, the C1 and C2 ceramic materials do not necessarily act as a Cu-sink.

The deactivation of the Cu/CHA filter system as observed in the SCR performance evaluation in the temperature range of 225 to 525° C. can most likely be explained by a loss in active Cu sites in the zeolite structure needed for SCR activity. The loss in active Cu sites may be explained by a stoichiometric ion exchange between $Na^+$ ions located in the glass phase of the filter material and the $Cu^{2+}$ ions located in the zeolite structure, as evidenced by microprobe analysis. Furthermore, the ion exchange may be a function of the initial $Na_2O$ content in the filter material composition. Therefore, in certain embodiments according to the disclosure, a maximum acceptable limit for $Na_2O$ levels is suggested in certain ceramic materials to avoid ion exchange reactions between the filter material and the active catalyst phase to avoid catalyst degradation under mild thermal aging conditions.

Various compositions were prepared as shown in Tables 7 and 8 below, and the theoretical sodium and potassium contents have been calculated for each composition.

TABLE 7

| Component | Na, ppm | K, ppm | Ca, ppm | Comp. Ex. 1 | Comp. Ex. 2 | Comp. Ex. 3 | Comp. Ex. 4 | Ex. 5 | Ex. 6 | Ex. 7 | Ex. 8 | Ex. 9 |
|---|---|---|---|---|---|---|---|---|---|---|---|---|
| Inorganics | | | | | | | | | | | | |
| Alumina, Microgrit WCA25 | 3400 | 20 | 230 | 44.18% | 44.18% | | | | | | | |
| Alumina, Almatis ACG15 | 800 | 10 | 210 | | | 43.63% | 43.90% | 43.55% | 44.18% | 44.18% | 44.18% | 44.18% |
| Titania, TiPure R101 | 130 | 1 | 0 | 33.52% | 33.52% | 32.93% | | 17.03% | 33.52% | 33.52% | 33.52% | 33.52% |
| Titania, Hitox STD | 1800 | 0 | 110 | | | | 34.07% | 17.46% | | | | |
| Talc, Cercron MB 96-67 | 300 | 40 | 1100 | 19.10% | 19.10% | 18.83% | 18.82% | 18.77% | 19.10% | 19.10% | 19.10% | 19.10% |
| Mg(OH)2, Magshield UF | 29 | 7 | 4074 | | | | | | | | | |
| Silica, Microsil 4515 | 40 | 60 | 53 | 2.71% | 2.71% | 2.67% | 2.24% | 2.23% | 2.71% | 2.71% | 2.71% | 2.71% |
| Y2O3 | 50 | 20 | na | 0.49% | 0.49% | | | | 0.49% | 0.49% | 0.49% | |
| CeO2, PIDC | 38 | 18 | 100 | | | 1.93% | 0.97% | 0.96% | | | | 0.96% |
| Pore Formers (as super addition to the inorganics) | | | | | | | | | | | | |
| Graphite, Ashbury 4566 | 200 | 20 | 210 | 8.00% | 8.00% | 10.00% | 8.00% | 10.00% | 14.00% | 10.00% | 10.00% | 14.00% |
| Native potato starch, Emsland | 30 | 900 | 106 | | 27.00% | | 27.00% | 30.00% | 32.00% | 30.00% | | 32.00% |
| VHXL Potato Starch, Emsland F8684 | 2500 | 180 | 94 | | | 31.50% | | | | | | |
| VHXL Potato Starch, Emsland F8684O | 230 | 26 | 320 | | | | | | | | | |
| VHXL Emselect 1000, Emsland F10153 | 570 | 63 | 480 | | | | | | | | | |
| Bylina pea starch | 73 | 31 | 140 | | | | | | | | | |
| XL pea starch, Emsland F9694 | 390 | 20 | 145 | 27.00% | | | | | | | 30.00% | |
| VHXL pea starch, Emsland F10157 | 230 | 11 | 140 | | | | | | | | | |
| XL Sago, Ingredion E910-55 | 55 | 6 | 240 | | | | | | | | | |
| Polyethylene, Honeywell ACumist F45 | 2 | 1 | 9 | | | | | | | | | |
| Extrusion Aids and Binders (as super addition to the inorganics) | | | | | | | | | | | | |
| Fatty Acid | na | na | na | 1.35% | 1.35% | 1.41% | 1.35% | 1.40% | 1.46% | 1.40% | 1.40% | 1.46% |
| Binder: F240 | 3500 | 50 | na | 4.05% | 4.05% | 8.91% | 2.03% | 2.10% | 4.38% | 4.20% | 4.20% | 4.39% |
| Binder: TY11A | 2100 | 20 | na | 2.03% | 2.03% | | 4.05% | 4.20% | 2.19% | 2.10% | 2.10% | 2.20% |
| Properties | | | | | | | | | | | | |
| Calculated Na content, ppm | | | | 0.193% | 0.183% | 0.159% | 0.121% | 0.094% | 0.070% | 0.068% | 0.079% | 0.070% |
| Calculated K content, ppm | | | | 0.003% | 0.027% | 0.008% | 0.026% | 0.029% | 0.031% | 0.029% | 0.002% | 0.031% |
| Calculated Ca content, ppm | | | | 0.037% | 0.036% | 0.036% | 0.039% | 0.038% | 0.037% | 0.036% | 0.037% | 0.037% |
| Total Calculated Na + K + Ca content, ppm | | | | 0.233% | 0.246% | 0.202% | 0.186% | 0.161% | 0.138% | 0.133% | 0.119% | 0.138% |
| Porosity, % | | | | 58.0 | 55.4 | 58.1 | 51.6 | 60.7 | 61.5 | 59.6 | 61.2 | 61.7 |

TABLE 8

| Component | Na, ppm | K, ppm | Ca, ppm | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|
| Inorganics | | | | | | | | | | | | | |
| Alumina, Microgrit WC A25 | 3400 | 20 | 230 | | | | | | | | | | |
| Alumina, Almatis ACG 15 | 800 | 10 | 210 | 44.18% | 43.63% | 43.76% | 43.76% | 43.76% | 43.76% | 43.76% | 41.71% | 43.95% | 41.91% |
| Titania, TiPure R101 | 130 | 1 | 0 | 33.52% | 32.93% | 33.19% | 33.19% | 33.19% | 33.19% | 33.19% | 33.10% | 33.14% | 33.25% |
| Titania, Hitox STD | 1800 | 0 | 110 | | | | | | | | | | |
| Talc, Cercron MB 96-67 | 300 | 40 | 1100 | 19.10% | 18.83% | 18.92% | 18.92% | 18.92% | 18.92% | 18.92% | 20.74% | 9.47% | 20.84% |
| Mg(OH)2, Magshield UF | 29 | 7 | 4074 | | | | | | | | | 4.43% | |
| Silica, Microsil 4515 | 40 | 60 | 53 | 2.71% | 2.67% | 2.68% | 2.68% | 2.68% | 2.68% | 2.68% | 3.01% | 8.53% | 3.02% |
| Y2O3 | 50 | 20 | na | | | | | | | | | | |
| CeO2, PIDC | 38 | 18 | 100 | 0.49% | 1.93% | 1.46% | 1.46% | 1.46% | 1.46% | 1.46% | 1.46% | 0.49% | 0.98% |
| Pore Formers (as super addition to the inorganics) | | | | | | | | | | | | | |
| Graphite, Ashbury 4566 | 200 | 20 | 210 | 10.00% | 14.00% | 12.00% | 12.00% | 12.00% | 12.00% | 12.00% | 10.00% | 14.00% | 10.00% |

TABLE 8-continued

| Component | Na, ppm | K, ppm | Ca, ppm | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|
| Native potato starch, Emsland VH XL | 30 | 900 | 106 | | | | 31.00% | | | | | | |
| Potato Starch, Emsland F8684 VH XL | 2500 | 180 | 94 | | | | | | | | | | |
| Potato Starch, Emsland F86 840 VH XL | 230 | 26 | 320 | | | 31.00% | | | | | | | |
| Emselect 1000, Emsland F10 153 | 570 | 63 | 480 | | | | | | | | | | |
| Bylina pea starch XL | 73 | 31 | 140 | | 28.50% | | | | | | | | |
| pea starch, Emsland F9 694 VH XL | 390 | 20 | 145 | | | | | | | | | | |
| pea starch, Emsland F10 157 XL | 230 | 11 | 140 | | | | | 31.00% | 31.00% | 31.00% | 28.00% | 16.00% | 26.00% |
| Sago, In- | 55 | 6 | 240 | | | | | | | | | | |

TABLE 8-continued

| Component | Na, ppm | K, ppm | Ca, ppm | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|
| gredion E910-55 | 2 | 1 | 9 | 30.00% | | | | | | | | | |
| Polyethylene, Honeywell A-C | | | | | | | | | | | | 16.00% | |
| Curnist F45 | | | | | | | | | | | | | |
| | | | | Extrusion Aids and Binders (as super addition to the inorganics) | | | | | | | | | |
| Fatty acid | na | na | na | 1.40% | 1.42% | 1.43% | 1.43% | 1.43% | 1.43% | 1.43% | 1.38% | 1.46% | 4.08% |
| Binder: F240 | 3500 | 50 | na | 2.10% | 6.41% | 6.44% | 6.44% | 6.44% | 6.44% | 6.44% | 2.07% | 2.19% | 2.04% |
| Binder: TY11A | 2100 | 20 | na | 4.20% | | | | | | | 4.14% | 4.38% | 1.36% |
| | | | | Properties | | | | | | | | | |
| Calculated Na content, ppm | | | | 0.064% | 0.082% | 0.078% | 0.072% | 0.078% | 0.089% | 0.073% | 0.064% | 0.069% | 0.063% |
| Calculated K content, ppm | | | | 0.002% | 0.003% | 0.003% | 0.030% | 0.002% | 0.004% | 0.003% | 0.002% | 0.002% | 0.002% |
| Calculated Ca content, ppm | | | | 0.033% | 0.038% | 0.043% | 0.036% | 0.038% | 0.048% | 0.038% | 0.041% | 0.044% | 0.038% |
| Total Calculated Na + K + Ca content, ppm | | | | 0.099% | 0.122% | 0.124% | 0.138% | 0.118% | 0.141% | 0.114% | 0.107% | 0.115% | 0.103% |
| Porosity, % | | | | 60.6 | 59.1 | 61.6 | 59.7 | 60.8 | 60.7 | 60.2 | 59.6 | 62.2 | 57.8 |

What is claimed is:

1. A method for preparing a composite body, said method comprising the steps of:
   applying at least one catalyst to a formed ceramic body prepared from a substrate composition comprising a pseudobrookite phase comprising at least 75% by weight $Al_2TiO_5$, wherein batch components of the substrate composition are chosen such that an elemental sodium content in the formed ceramic body is less than about 1200 ppm; and
   thermally aging the formed ceramic body with the at least one catalyst at about 800° C. for about 64 hours in air containing about 10% by volume of $H_2O$, wherein the formed ceramic body with the at least one catalyst has a substantially maintained catalytic BET surface area of at least about 55% after the thermal aging.

2. The method according to claim 1, wherein the content of elemental sodium in the composite body is less than about 1000 ppm.

3. The method according to claim 1, wherein the content of elemental sodium in the composite body is less than about 750 ppm.

4. The method according to claim 1, wherein the content of elemental sodium in the composite body is less than about 500 ppm.

5. The method according to claim 1, wherein the at least one catalyst is in a washcoat applied to the formed ceramic body in an amount of at least 5 grams per liter of formed ceramic body.

6. The method according to claim 1, wherein the at least one catalyst is chosen from zeolite catalysts.

7. The method according to claim 1, wherein the at least one catalyst comprises a chabazite catalyst.

8. The method according to claim 1, wherein the at least one catalyst comprises a copper-exchanged chabazite catalyst.

9. The method according to claim 1, having a substantially maintained catalytic BET surface area of at least about 60% after thermal aging at about 800° C. for about 64 hours in air containing about 10% by volume of $H_2O$.

10. The method according to claim 1, having a substantially maintained catalytic BET surface area of at least about 70% after thermal aging at about 800° C. for about 64 hours in air containing about 10% by volume of $H_2O$.

* * * * *